US011856131B2

(12) United States Patent
Bork

(10) Patent No.: US 11,856,131 B2
(45) Date of Patent: Dec. 26, 2023

(54) METHOD FOR TESTING THE FUNCTIONAL CAPABILITY OF AN EMERGENCY CALL DEVICE OF A MOTOR VEHICLE, AND MOTOR VEHICLE FOR CARRYING OUT SAID METHOD

(71) Applicant: VOLKSWAGEN AKTIENGESELLSCHAFT, Wolfsburg (DE)

(72) Inventor: Simon Bork, Calberlah (DE)

(73) Assignee: Volkswagen Aktiengesellschaft

( * ) Notice: Subject to any disclaimer, the term of this patent is extended or adjusted under 35 U.S.C. 154(b) by 203 days.

(21) Appl. No.: 17/433,442

(22) PCT Filed: Jan. 17, 2020

(86) PCT No.: PCT/EP2020/051130
§ 371 (c)(1),
(2) Date: Aug. 24, 2021

(87) PCT Pub. No.: WO2020/173616
PCT Pub. Date: Sep. 3, 2020

(65) Prior Publication Data
US 2022/0053085 A1 Feb. 17, 2022

(30) Foreign Application Priority Data
Feb. 27, 2019 (DE) .................... 10 2019 202 662.1

(51) Int. Cl.
*H04M 3/28* (2006.01)
*H04W 4/44* (2018.01)
(Continued)

(52) U.S. Cl.
CPC ............... *H04M 3/28* (2013.01); *B60R 21/01* (2013.01); *H04W 4/44* (2018.02); *H04W 4/90* (2018.02);
(Continued)

(58) Field of Classification Search
CPC .... H04M 1/24; H04M 1/6091; H04M 1/6016; H04R 29/00; H04R 2499/13; H04R 2420/07; H04R 2420/05; G01C 21/3629
See application file for complete search history.

(56) References Cited

U.S. PATENT DOCUMENTS

| 5,682,134 A | 10/1997 | Stallbohm |
| 7,039,513 B2 | 5/2006 | Hermann et al. |

(Continued)

FOREIGN PATENT DOCUMENTS

| CN | 1705578 A | 12/2005 |
| CN | 102857645 A | 1/2013 |

(Continued)

OTHER PUBLICATIONS

Office Action; Chinese Patent Application No. 202080017353.6; dated Nov. 14, 2022.

(Continued)

*Primary Examiner* — Ernest G Tacsik
(74) *Attorney, Agent, or Firm* — BARNES & THORNBURG, LLP

(57) ABSTRACT

A method for testing the functional capability of an emergency call device of a transportation vehicle. In an emergency mode, at least one specific audio signal is generated for a vehicle passenger by the emergency call device and emitted to the interior of the transportation vehicle. For testing, the emergency call device is put into a testing mode in which the at least one audio signal intended for the emergency is generated and wherein, in the testing mode, the generated audio signal passes, within the vehicle-internal emergency call device, through a signal path which is modified compared with the emergency mode.

9 Claims, 2 Drawing Sheets

(51) Int. Cl.
*H04W 4/90* (2018.01)
*B60R 21/01* (2006.01)

(52) U.S. Cl.
CPC .............. *B60R 2021/01088* (2013.01); *H04M 2242/04* (2013.01)

(56) References Cited

U.S. PATENT DOCUMENTS

| | | | |
|---|---|---|---|
| 10,057,750 B2 | 8/2018 | Gellens | |
| 10,791,221 B1* | 9/2020 | Vislocky | ............. H04M 3/5116 |
| 2005/0065779 A1 | 3/2005 | Odinak | |
| 2006/0262103 A1 | 11/2006 | Hu et al. | |
| 2007/0126564 A1* | 6/2007 | Lee | ........................ B60Q 9/005 |
| | | | 340/435 |
| 2013/0328671 A1* | 12/2013 | McKown | ................. B60Q 5/00 |
| | | | 340/425.5 |
| 2014/0100714 A1* | 4/2014 | Linn | ....................... G01M 7/02 |
| | | | 701/2 |
| 2016/0029197 A1 | 1/2016 | Gellens | |
| 2017/0136973 A1 | 5/2017 | Lee | |
| 2017/0246466 A1 | 8/2017 | Murphy et al. | |
| 2018/0074661 A1 | 3/2018 | Zhao et al. | |
| 2019/0051060 A1 | 2/2019 | Rapeta et al. | |
| 2019/0381964 A1* | 12/2019 | Halford | ................ G08B 25/016 |
| 2021/0337330 A1* | 10/2021 | Disatnik | ................. H04M 1/24 |

FOREIGN PATENT DOCUMENTS

| | | |
|---|---|---|
| CN | 106537931 A | 3/2017 |
| DE | 19530729 A1 | 2/1997 |
| DE | 102008018868 A1 | 10/2008 |
| DE | 102013224809 A1 | 6/2015 |
| DE | 102017121059 A1 | 3/2018 |
| DE | 102017220466 B3 | 1/2019 |
| EP | 2092275 A2 | 8/2009 |
| IN | 106696882 A | 5/2017 |
| WO | 2008125654 A2 | 10/2008 |

OTHER PUBLICATIONS

Search Report for International Patent Application No. PCT/EP2020/051130; dated Apr. 23, 2020.

* cited by examiner

METHOD FOR TESTING THE FUNCTIONAL CAPABILITY OF AN EMERGENCY CALL DEVICE OF A MOTOR VEHICLE, AND MOTOR VEHICLE FOR CARRYING OUT SAID METHOD

PRIORITY CLAIM

This patent application is a U.S. National Phase of International Patent Application No. PCT/EP2020/051130, filed 17 Jan. 2020, which claims priority to German Patent Application No. 10 2019 202 662.1, filed 27 Feb. 2019, the disclosures of which are incorporated herein by reference in their entireties.

SUMMARY

Illustrative embodiments relate to a method for testing the functional capability of an emergency call device of a transportation vehicle. Illustrative embodiments also relate to a transportation vehicle for carrying out the method.

BRIEF DESCRIPTION OF THE DRAWINGS

Disclosed embodiments are illustrated in the figures and are explained in more detail in the following description with reference to the figures. The same reference signs refer to the same, comparable or functionally equivalent components, including in different figures. Corresponding or comparable properties are thereby achieved, even if a repeated description or reference does not occur. The figures are not, or at least not always, true-to-scale. Proportions or spacings can, in some figures, be represented in an exaggerated way to be able to more clearly emphasize features of an exemplary embodiment. In the drawings.

DETAILED DESCRIPTION

Figure 1:
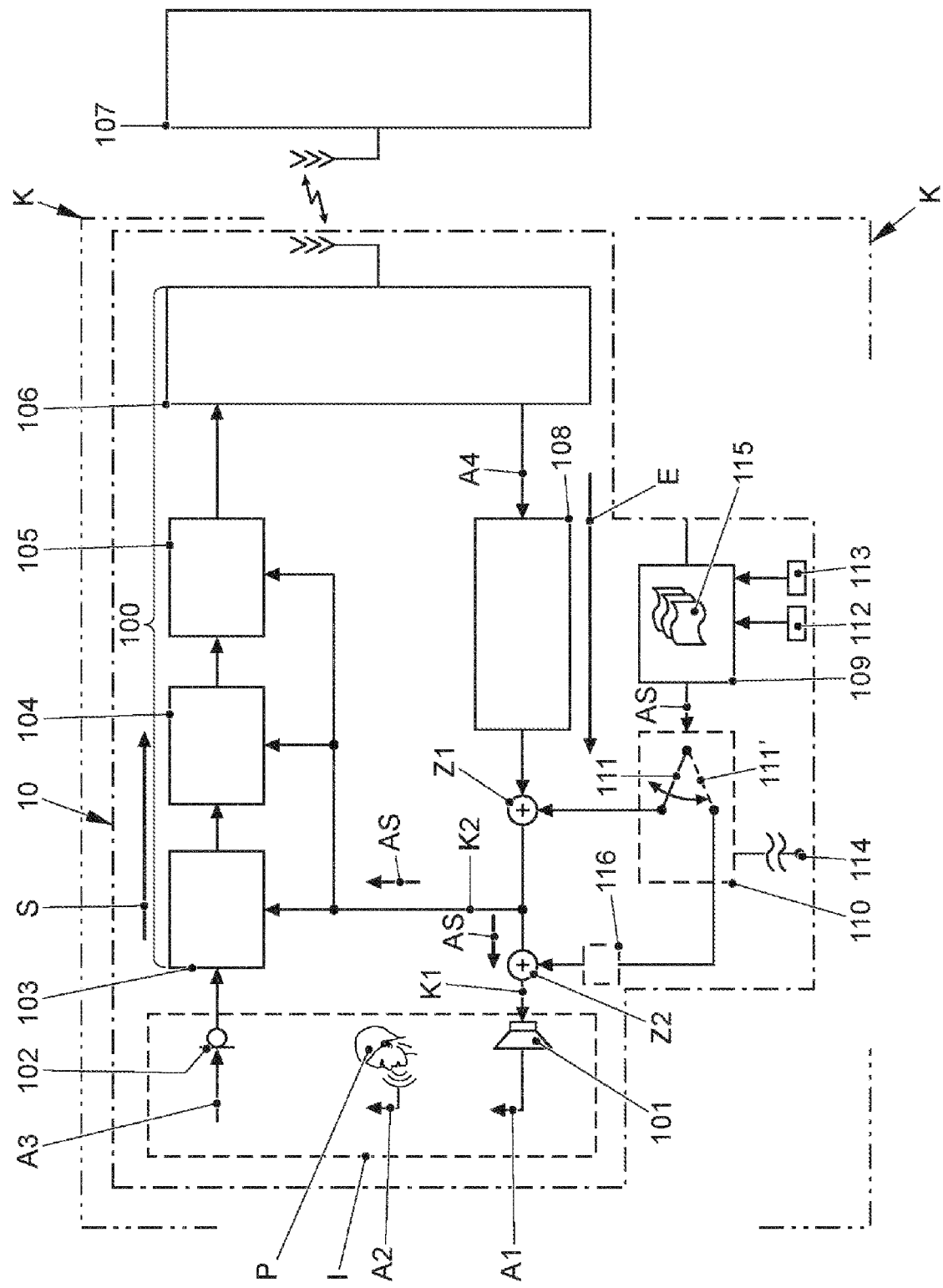
FIG. 1 schematically illustrates a transportation vehicle suitable for carrying out the disclosed method, and FIG. 2 schematically illustrates a possible incorporation of the method in a crash test.

It is obligatory that emergency call devices are installed in all new transportation vehicles. Their purpose is to be able to send an emergency call to a rescue center or the like automatically, or also by using a simple actuation device in the interior of the transportation vehicle, when an emergency situation has arisen. Such an emergency situation can, for example, be a traffic accident or a critical health condition of a vehicle occupant.

It is obvious that high demands are placed on the acoustic performance and functional capability of such an emergency call device. In the certification according to the specification ERA/Glonass (GOST R 55531, iGOST 33468-2015) and ITU-T P.1140 high requirements are placed on the acoustic performance of an emergency call device, and the situation in Europe is similar. TÜV inspectors require, inter alia, that an audio signal must be heard immediately after the crash and the associated automatic set-up of an emergency call (eCall) at the intercom site (external transmitting/receiving station). In other words, an automatic call from the transportation vehicle to a land line number at which a tester accepts the call is to take place after the crash.

DE 10 2017 121 059 A1 describes a method for the identification and generation of image characters or pictograms (also known as emojis) at a mobile communication device such as are most often sent by a user. This should make it easier for a user to insert such emojis into electronic messages. A transportation vehicle is also described in this document with which emergency calls can be sent to external rescue or breakdown services via a telematic unit. The self-test of a medical device, in particular, a defibrillator, is known from U.S. Pat. No. 2,017,246 466 A1. Concretely, the defibrillator passes through a boot process with two phases after having been switched on. In the first phase of the boot process, a first sequence of tests is carried out, wherein each test checks the functionality of existing circuits of the device and, depending on the result, supplies information relating to the fitness for use of the medical device. The second phase of the boot process is then carried out, in which further circuits are checked. The information regarding the result of the self-test can be provided via a loudspeaker and a display.

A method for the wireless communication of a transportation vehicle emergency call system can be found in U.S. Pat. No. 2,016,029 197 A1. Concretely, a description is given of the process in which information regarding which telematic capabilities are available to the transportation vehicle, and which functionalities the transportation vehicle can carry out using telematic services in an emergency, is sent from a transmitting device of the transportation vehicle to an external receiving device. The telematic services can, for example, include the transmission of accident diagnostic data (accident location, seriousness of the accident, airbag triggering etc.). An automatic emergency call can be placed on the basis of which the telematic capabilities of the transportation vehicle can be listened to by the external rescue station. It is also conceivable that the transportation vehicle is fitted out in such a way that a component of the transportation vehicle can be activated or deactivated via a remote telematic service. This can, for example, include switching the ignition on or off, interrupting the supply of fuel, or unlocking/locking the doors.

On the basis of this prior art, the disclosed embodiments provide a method for testing the functional capability of an emergency call device of a transportation vehicle that can be carried out conveniently and reliably. In particular, the fundamental precondition is to be provided such that, after a crash test, only the signals generated by the emergency call device, and not any other audio signals reaching the emergency call device from outside (for example, from the tester through the external transmitting/receiving station) can be heard by the tester at an external receiving station. Disclosed embodiments also provide a transportation vehicle suitable for carrying out the method.

According to the disclosed embodiments, a method is thus proposed for testing the functional capability of an emergency call device of a transportation vehicle. In an emergency mode that corresponds to the usual, preset operating mode of the emergency call device, at least one specific audio signal can be generated and output into the interior of the transportation vehicle for a vehicle occupant in distress by the emergency call device. This is usually done by a loudspeaker.

An emergency operation of the emergency call device can, for example, be triggered by a crash, or also manually by actuating an emergency button or the like.

In an emergency, to provide certainty and reassurance to the vehicle occupant that an emergency call has successfully been placed and that fast help can be expected, specific audio signals are therefore played through the loudspeaker into the interior of the transportation vehicle. The audio signals can, for example, be generated by executing stored audio data (known as audio prompts).

It is, for example, conceivable that a voice message is generated with the content: "An emergency call has been set up successfully! Help will arrive soon!". The audio signal can, alternatively, also be generated using a TTS (text to speech) device that converts stored text files into audio signals.

In the disclosed testing method, the emergency call device is brought into a test mode for the purpose of testing (i.e., without an emergency actually being present). The at least one audio signal actually intended for the emergency is now generated in the test mode. In addition, the generated audio signal travels, in the test mode, along a signal path modified in comparison with the emergency mode within the emergency call device internal to the transportation vehicle. In this way, the fundamental precondition is created such that after an emergency call has been set up, a tester at the remote end only hears the audio signals generated by the emergency call system. In addition, through switching over, a clear separation between the preset emergency mode and the specially selected test mode can very reliably be created. It is also conceivable that enabling the test mode is legitimized through the input of a password.

After a suitable radio connection has been set up, the generated audio signal can be transmitted wirelessly via the emergency call device to a transmitting/receiving station or a monitoring station external to the transportation vehicle. The radio connection may be set up using a common mobile radio standards such as GSM, LTE, 5G or the like. It should be noted that a radio connection does not necessarily have to be established to test the emergency call device. If, for example, it is only desired to test whether audio signals can be emitted into the transportation vehicle via an emergency loudspeaker present in the interior of the transportation vehicle, then this is also possible for on-site fault-finding or inspection. The audio signal may be continuously replayed as a permanent loop.

It is here also conceivable as a further development of the method, that the generated audio signal is routed in the test mode into the interior of the transportation vehicle, acoustically replayed there (for example, through a loudspeaker) acoustically, acoustically recorded (for example, using a microphone), forwarded to a transmitting device of the emergency device internal to the transportation vehicle, and transmitted to a monitoring station external to the transportation vehicle. The generated audio signal is not made available as a reference signal for a filtering out of the audio signal that is to be carried out in the emergency mode. Thus, in an effective signaling manner, it is ensured that the audio signals reaching the interior are directly forwarded to the monitoring station external to the transportation vehicle.

The method in this way offers a simple, direct testing possibility for an external tester as to whether and which audio signals are forwarded into the interior of the transportation vehicle by the emergency call device in the event of an emergency.

In a disclosed embodiment, the emergency call device is placed in the test mode before carrying out a crash test, optionally immediately beforehand.

It has been found that such a procedure makes testing the functional capability of the emergency call device very convenient and reliable, in particular, in connection with a crash test. In this way, the replay of stored files, such as audio prompts or texts, is also possible immediately after performing a crash test. This contributes to a convenient certification of new transportation vehicles for which type testing is obligatory.

Also, however, even before the crash test, that is when the transportation vehicle is still in the starting position for the crash, audio signals, optionally as a continuous loop, are generated in test mode in the transportation vehicle by the emergency call device, to test whether the replay takes place properly in the interior of the transportation vehicle. The crash test is only carried out after the "continuous loop" is running, and a tester can hear the audio signal in the transportation vehicle.

It is thus conceivable after, or optionally immediately after, the crash test, a connection is set up with the monitoring station external to the transportation vehicle. The at least one audio signal is generated here, output acoustically into the interior of the transportation vehicle, and also acoustically recorded in the interior of the transportation vehicle. The recorded audio signal is then transmitted to the monitoring station that is external to the transportation vehicle.

In this way, the monitoring station can obtain an authentic impression of what a transportation vehicle occupant would hear in the interior of the transportation vehicle after an emergency call has been triggered.

As already explained, a transportation vehicle suitable for carrying out the method is also to be provided. Such a transportation vehicle comprises an emergency call device that comprises at least one loudspeaker and at least one microphone in the interior of the transportation vehicle. The microphone and the loudspeaker may be components of a hands-free facility of the transportation vehicle. The loudspeaker and the microphone may be integrated into the interior of the transportation vehicle in a crash-proof manner. A signal processing and connecting module is furthermore present, wherein the signal processing and connecting module can receive audio signals via a transmitting and receiving device from an external transmitting/receiving station and can also transmit audio signals to the station. The external transmitting/receiving station can, for example, act as an emergency station or as a monitoring station (workshop, Technical Inspection Association (TÜV) or the like).

It is now proposed that the emergency call device can be placed in a test mode such that audio signals output via the loudspeaker (when an emergency has been triggered, for example, by a crash test) are acoustically recorded by the microphone and are transmitted via the transmitting and receiving device to the external transmitting and receiving station.

The disclosed method can, in this way, be carried out with the transportation vehicle. It is thus easily made possible for the external testing station to be able to check whether and which audio signals are replayed in the interior of the transportation vehicle in an emergency.

It is conceivable in at least one disclosed embodiment that at least one memory and execution device is present in which at least one audio or text file is stored. The audio file can be executed in an emergency, and its audio signals can be output via the loudspeaker. If the file is present as a text file, then the text can also be converted into suitable audio signals by a TTS (text-to-speech) device. The connecting module here comprises at least one audio signal processing operating in a transmitting direction and at least one audio signal processing operating in a receiving direction. Generated audio signals of the audio file that can be executed in an emergency (audio prompts or via text file) can be brought via a first audio channel to the loudspeaker and via a second audio channel to a filter device. The filter device considers the audio signals as reference signals that the filter device filters out again from audio signals routed via the microphone in the transmitting direction into the audio signal processing.

The emergency call device can now be placed in such a test mode in which a signal path is generated in which audio signals of the at least one audio file that can be executed by the memory and execution device are only now passed via the first audio channel to the loudspeaker, and no longer via the second audio channel to the filter device.

In the test mode, a different, or in other words a reduced, signal path internal to the transportation vehicle is thus described.

This offers the benefit that the testing of the emergency call device can be carried out at the transportation vehicle without additional technical components. It is, rather, possible with the technical components that are in any case installed in the transportation vehicle, and indeed in a crash-proof manner.

Reference is first made to FIG. 1.

A transportation vehicle K that has an emergency call device 10 can be seen. The emergency call device 10 comprises a loudspeaker 101 and a microphone 102. The loudspeaker 101 and the microphone 102 form part of a hands-free facility of the transportation vehicle K. They are installed in a crash-proof manner in an interior I of the transportation vehicle K.

The emergency call device 10 comprises a signal processing and connecting module 100 with which audio signals A3 recorded by the microphone 102 from the interior I are further processed in a transmitting device S and can be transmitted to a monitoring station 107, or a transmitting and receiving device 107, external to the transportation vehicle.

The signal processing and connecting module 100 comprises an audio signal processing device 103 that follows a filter device 104 and a noise reduction device 105. A transmitting and receiving device 106 that also follows these components in transmitting direction S is only used to transmit outgoing audio signals to the monitoring station 107 external to the transportation vehicle.

In a receiving direction E, audio signals A4 coming from the monitoring station (or transmitting and receiving device) 107 external to the transportation vehicle which can, for example, be instructions given by telephone by an assistant at an emergency station, are received by the transmitting and receiving device 106 and are further processed by an audio signal processing device 108. Audio signals A4 of this sort coming from outside can then be routed via an audio channel K1 to the loudspeaker 101, and replayed in the interior I as audio signals A1 that are audible to a vehicle occupant P.

The transportation vehicle K is furthermore fitted out with a memory and execution device 109. A plurality of audio or text files 115 (audio files: known as audio prompts) are permanently stored for an emergency in the memory and execution device 109.

If an emergency occurs, resulting, for example, from an accident, a trigger signal can be sent to the memory and execution device 109 by an airbag control device 112. The result of this is that one or a plurality of audio or text files 115 are executed, and an audio signal AS is thus generated. In relevant cases, the text files 115 must first be converted into audio signals by the memory and execution device 109.

The speech content of an audio file 115 can, for example, have the following content: "An emergency call has been made! The connection has been set up successfully! Help will arrive soon."

Alternatively, the transmission of a trigger signal to the memory and execution device 109 is also conceivable by way of a manually operable emergency switch 113 that is installed at an easily reached location in the interior I of the transportation vehicle.

The audio signal AS generated in an emergency is now routed to an aggregation point Z1, from which the audio signal AS is routed both to the audio channel K1 as well as to a second audio channel K2.

The audio signal AS reaches the loudspeaker 101 via the audio channel K1, where it can be heard by vehicle occupant P as the audio signal A1 coming from the loudspeaker 101.

In an emergency, the vehicle occupant P can also speak via the hands-free facility of the transportation vehicle, which is to say via the microphone 102, and thus output audio signals A2 that reach the interior I of the transportation vehicle K.

Both the audio signals A1 and the audio signals A2 reach the microphone 102, where they are recorded as audio signals A3 by the microphone 102.

If, however, a speech connection is established in an emergency between the emergency device 10 and the external transmitting and receiving device 107, or an external emergency station, it is not desirable that the audio signals A1 (which are based on the external audio signals A4 or on the generated audio signal AS) are also heard by the external emergency station at the remote end. For that reason, all the audio signals (AS and/or A4) leaving the aggregation point Z1 are also routed to the second audio channel K2.

The result of this is that the audio signals AS and/or A4 that are routed to the audio channel K2 are deemed by the filter device 140 to be internal audio reference signals that must be filtered out again from the signals forwarded in the transmitting direction S. In other words, all the audio signals A1 reaching the interior I from the loudspeaker 101 are again filtered out from the audio signals A3 recorded by the microphone 102, so that only the audio signals A2 reaching the interior from the vehicle occupant P still remain. Thus only the audio signals A2 generated by the vehicle occupant P arrive at the transmitting and receiving device 107 external to the transportation vehicle, potentially having had secondary noise thereof reduced by the noise reduction device 105.

To test the functional capability of the emergency call device 10 and, in particular, the function of the audio signals AS that can be generated, the emergency call device 10 can be switched into a test mode using a diagnostic interface 114 of the transportation vehicle that is in any case present.

A changeover logic 110 is activated for this purpose, in which a logical switch 111 can be switched over in such a way (see item 11F) that in the test mode all the generated audio signals AS travel along a different signal path than in the "normal" emergency mode of the emergency call device 10.

If an audio file 115 is executed in test mode and an audio signal AS thereby generated, it reaches an aggregation point Z2. In appropriate cases, the audio signal AS that has been generated can first be processed by an equalizer 116 that is matched to the specific features of the transportation vehicle type.

The generated audio signal AS only now reaches the loudspeaker 101 from the aggregation point Z2 via the audio channel K1 to. In the test mode, the audio signal AS thus no longer reaches the audio channel K2.

As a consequence, the audio signal AS and the audio signals A4 coming from outside emerge as a single signal A1 from the loudspeaker 101, are recorded by the microphone 102 as an incoming audio signal A3, and in the transmitting direction S reach the audio signal processing device 103.

Since the audio signal A4 reaching the emergency call device 10 from outside however continues to reach the audio channel K2, it is calculated away from the audio signal A3 by the filter device 104. This is also important for the testing after the crash. This is because if the tester at the external transmitting and receiving device 107 speaks into his telephone with which he examines the replay of the audio file A1 in the transportation vehicle after the crash, he should not hear himself, but only the audio signals generated by the audio or text file 115. In some cases, a vehicle occupant P may after a while be placed as a second tester in the interior I, and the two testers can additionally carry out a subjective test in that, for example, they read texts unknown to each other and "test" for understandability.

Because the audio signal AS generated in test mode is now no longer available as an audio reference signal via the audio channel K2 it is also no longer filtered out by the filter device 104. The audio signal AS generated by the audio files 115 (audio prompts) thus reaches the transmitting and receiving device 106 as outgoing audio signal A5, and can be forwarded by this to the external transmitting and receiving device 107. The audio signal A5 can be examined there by a test person (e.g., a TÜV tester or workshop foreman).

Figure 2:
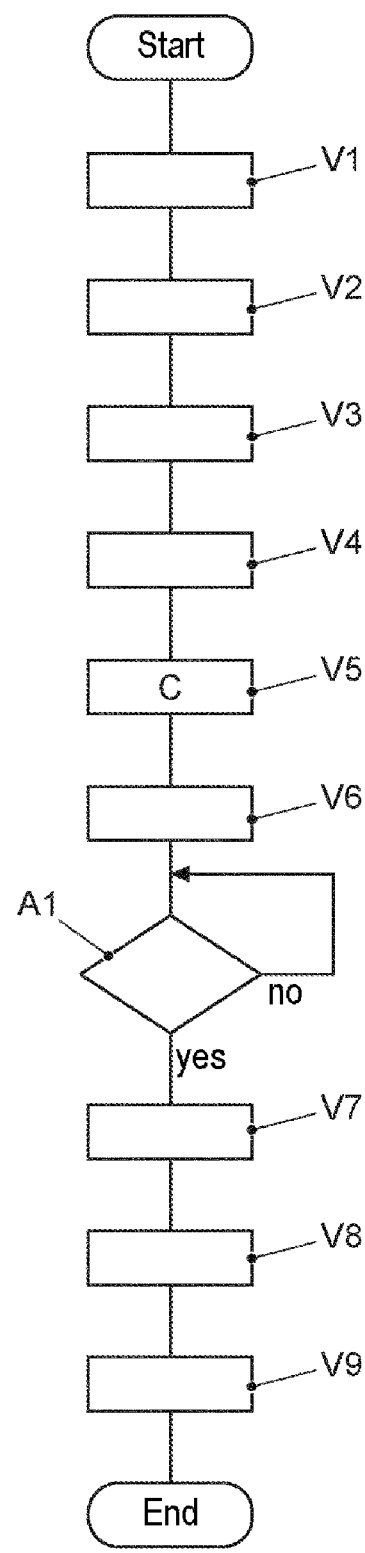

With reference to FIG. 2 it is now to be shown how the method for testing the functional capability of the emergency call device 10 can usefully be embedded in a crash test.

In a method operation at V1 the motor transportation vehicle K is first connected via the diagnostic interface 114 to a suitable diagnostic tool (diagnostic software). The option "Test mode" is selected here. A password query to enable all the further method operations now takes place in a method operation at V2.

After successful input of the password, the language (German, English etc.) to be used for output through the loudspeaker 101 during automatic emergency call set-up is selected in a method operation at V3. In other words, it is specified which of the audio or text files 115 stored in the memory and execution device 109 are to be executed (compare also FIG. 1).

A specification is also made in method operation at V3 as to how many times the selected audio or text files 115 are to be executed. The number that can be entered can range from 1 up to n (continuous loop). Optionally, the execution of a continuous loop is set.

The logical changeover by the changeover logic 110 takes place in method operation at V4. The switch 111 is thus placed, logically speaking, in the position 111'.

Before carrying out the next method operation, however, replay of the audio or text files 115 is firstly activated for test purposes, to be sure that the replay of the audio or text files 115 actually functions at least before the crash test.

An actual crash test C for the transportation vehicle K is then carried out in method operation at V5. It is beneficial here that the crash-proof loudspeaker 101 and the likewise crash-proof microphone 102 that are in any case installed in the transportation vehicle K can be used. The other components of the emergency call device 10 are also designed in a crash-proof manner.

Due to the crash C having been carried out, an automatic emergency call is initiated by the airbag control device 112 in a method operation at V6.

Following this, a query A asks whether the set-up of the connection initiated for this purpose was successful or not. If the connection is set up successfully, then the selected audio file 115 is replayed in a method operation at V7, and the generated audio signal AS is replayed as audio signal A1 via the loudspeaker 101.

The recording of the generated audio signal AS as audio signal A3 entering the microphone takes place in method operation at V8.

The transmission of the generated audio signal AS as the audio signal A5 to the monitoring station 107 external to the transportation vehicle finally takes place in a method operation at V9.

LIST OF REFERENCE SIGNS

10 Emergency call device
100 Signal processing and connecting module
101 Loudspeaker
102 Microphone
103 Audio signal processing device in the transmitting direction
104 Filter device
105 Noise reduction device
106 Transmitting and receiving device internal to the transportation vehicle
107 Monitoring station external to the transportation vehicle; transmitting and receiving device external to the transportation vehicle
108 Audio signal processing device in the receiving direction
109 Memory and execution device
110 Changeover logic
111, 111' Switch
112 Airbag control device
113 Emergency switch
114 Diagnostic interface
115 Audio or text files
116 Equalizer
A Query
A1 Audio signal from the loudspeaker
A2 Audio signal from vehicle occupant
A3 Audio signal entering the microphone
A4 Audio signal from outside
A5 Outgoing audio signal
AS Audio signal generated by audio file
C Crash test
E Receiving direction (incoming)
I Interior
K Transportation vehicle
K1 Audio channel
K2 Audio channel
P Vehicle occupant
S Transmitting direction (outgoing)
V1-V9 Method operations
Z1 Aggregation point
Z2 Aggregation point

The invention claimed is:

1. A method for testing functional capability of an emergency call device internal to a transportation vehicle, the emergency call device including at least one memory and execution device and a signal processing and connecting module, the method comprising:
generating audio signals from at least one text or audio file stored in the at least one memory and execution device for execution in an emergency and outputting the generated audio signals via at least one loud speaker included in the transportation vehicle;

performing audio signal transmission and reception by the signal processing and connecting module via a transmitting and receiving device from an external transmitting/receiving station;

wherein, in a test mode, the emergency call device generates audio signals output via the loudspeaker that are acoustically recorded by at least one microphone in an interior of the transportation vehicle and are transmitted via the transmitting and receiving device to the external transmitting and receiving station wherein the signal processing and connecting module comprises at least one audio signal processing device operating in a transmitting direction and at least one audio signal processing device operating in a receiving direction, wherein generated audio signals of the audio file that are executed in an emergency are transmitted, via a first audio channel, to the at least one loudspeaker, and, via a second audio channel, to a filter that uses the audio signals as reference signals that the filter filters out from audio signals routed via the at least one microphone in the transmitting direction of the audio signal processing, wherein, while the emergency call device is in a test mode, a signal path is generated in which audio signals of the at least one audio file that is stored and executed by the memory and execution device are transmitted only via the first audio channel to the loudspeaker but not via the second audio channel to the filter.

2. The method of claim 1, wherein the outputting of the audio signal during the test mode includes:

routing the generated audio signal into the interior of the transportation vehicle;

acoustically replaying the generated audio signal in the transportation vehicle interior;

acoustically recording the generated audio signal;

forwarding the audio signal to a transmitting device of the emergency device internal to the transportation vehicle; and transmitting the generated audio signal to a monitoring station external to the transportation vehicle, wherein the generated audio signal for the test mode is not made available as a reference signal for a filtering out of the audio signal that is performed in the emergency mode thereby ensuring that audio signals reaching the transportation vehicle interior are directly forwarded to the monitoring station external to the transportation vehicle.

3. The method of claim 1, further comprising placing the emergency call device into the test mode before carrying out a crash test, wherein the audio signal is generated by the emergency call device as a continuous loop during the test mode.

4. The method of claim 3, further comprising:

during the test mode and after the crash test, setting up a connection with the monitoring station external to the transportation vehicle;

acoustically outputting the generated at least one audio signal into the interior of the transportation vehicle;

acoustically recording the output at least one audio signal in the interior of the transportation vehicle; and transmitting the recorded at least one audio signal to the monitoring station that is external to the transportation vehicle.

5. A transportation vehicle with an emergency call device that comprises:

at least one loudspeaker; and at least one microphone in an interior of the transportation vehicle;

at least one memory and execution device in which at least one text or audio file is stored for execution in an emergency and from which generated audio signals are output via the at least one loudspeaker; and a signal processing and connecting module, wherein the signal processing and connecting module performs audio signal transmission and reception via a transmitting and receiving device from an external transmitting/receiving station, wherein, in a test mode, the emergency call device generates audio signals output via the loudspeaker that are acoustically recorded by the at least one microphone and are transmitted via the transmitting and receiving device to the external transmitting and receiving station wherein the signal processing and connecting module comprises at least one audio signal processing device operating in a transmitting direction and at least one audio signal processing device operating in a receiving direction, wherein generated audio signals of the audio file that are executed in an emergency are transmitted, via a first audio channel, to the at least one loudspeaker, and, via a second audio channel, to a filter that uses the audio signals as reference signals that the filter filters out from audio signals routed via the at least one microphone in the transmitting direction of the audio signal processing, wherein, while the emergency call device is in a test mode, a signal path is generated in which audio signals of the at least one audio file that is stored and executed by the memory and execution device are transmitted only via the first audio channel to the loudspeaker but not via the second audio channel to the filter.

6. The transportation vehicle of claim 5, wherein, while the emergency call device is placed in the test mode, the at least one audio signal intended for the emergency is generated, and wherein, the generated audio signal travels, in the test mode, along a signal path modified in comparison with an emergency mode within the emergency call device internal to the transportation vehicle.

7. The transportation vehicle of claim 5, wherein the modified signal path during the test mode includes routing the generated audio signal into the interior of the transportation vehicle, acoustically replaying the generated audio signal in the transportation vehicle interior, acoustically recording the generated audio signal, forwarding the audio signal to a transmitting device of the emergency device internal to the transportation vehicle, and transmitting the generated audio signal to a monitoring station external to the transportation vehicle, wherein the generated audio signal is not made available as a reference signal for a filtering out of the audio signal that is performed in the emergency mode.

8. The transportation vehicle of claim 5, wherein the emergency call device is placed into the test mode before carrying out a crash test and the audio signal is generated by the emergency call device as a continuous loop.

9. The transportation vehicle of claim 8, wherein after the crash test, a connection is set up with the monitoring station external to the transportation vehicle, wherein the generated at least one audio signal is output acoustically into the interior of the transportation vehicle, acoustically recorded in the interior of the transportation vehicle and transmitted to the monitoring station that is external to the transportation vehicle.

\* \* \* \* \*